Patented Feb. 23, 1932

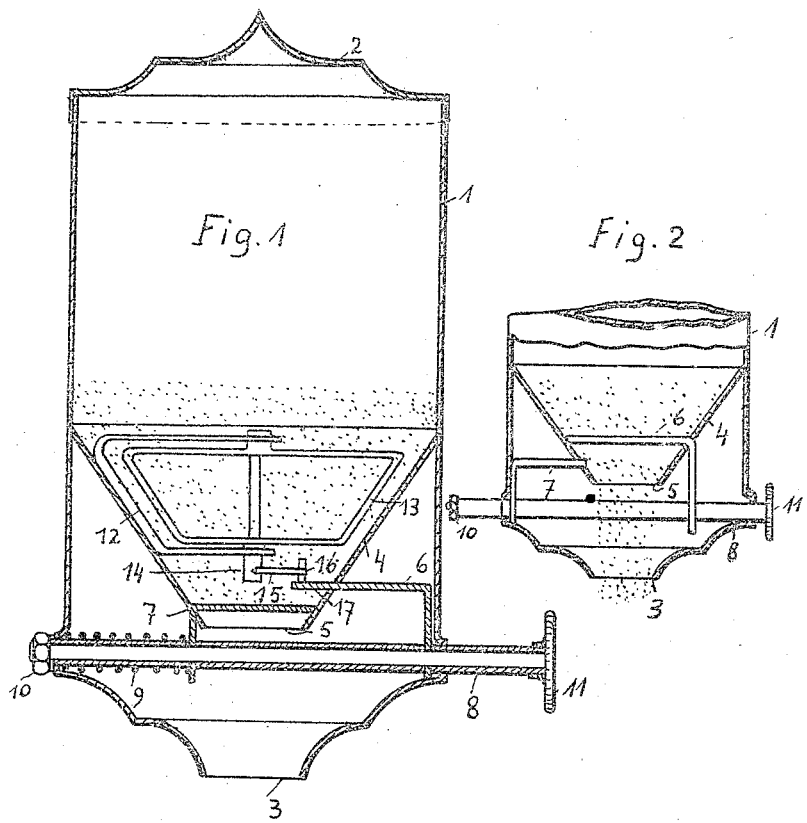
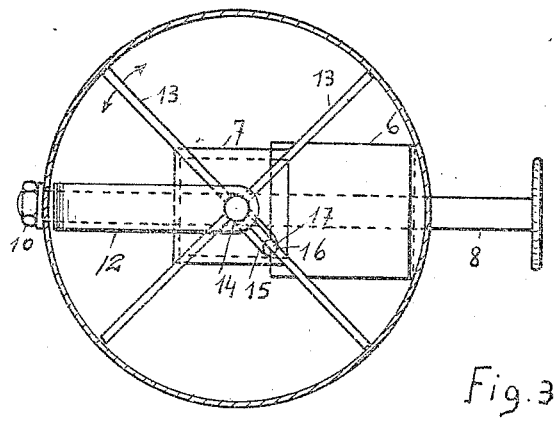

1,846,775

UNITED STATES PATENT OFFICE

ROBERT WEGMANN AND ALFRED RYMANN, OF SUHR, SWITZERLAND

APPARATUS FOR DELIVERING MEASURED QUANTITIES OF POWDERED OR GRANULAR SUBSTANCES

Application filed July 17, 1929. Serial No. 378,971.

The invention relates to apparatus for delivering measured quantities of powdered or granular substances, the apparatus being hygienically closed and adapted, for example, for domestic and sanitary purposes, for delivering coffee, washing powder, soap powder and so on. Advertisements may be displayed on the apparatus.

According to our invention the container for the substance to be delivered has above its discharge orifice two shutters, connected with each other for collective movement, one shutter being closed when the other is opened, so that when the bottom shutter is opened the substance between the two shutters is discharged. For guiding the granular substance from the walls of the container towards a central discharge opening we may have in the container a hopper or funnel, which receives the substance and whose outlet, above that of the container is controlled by the shutters.

An apparatus according to the invention is shown in the annexed drawings, in which Fig. 1 is a vertical section thereof, and Fig. 2 a vertical section to a smaller scale, with parts omitted and showing certain parts in another position.

Fig. 3 is a plan view, with the cover removed.

The container 1 has a cover 2 and a discharge opening 3 at the bottom. Within it is a hopper 4, having its discharge opening 5 above the opening 3. This hopper is conical and gradually merges downward into rectangular shape at its lower, smaller end. Two shutters 6 and 7 one above the other, are slidable in slots in the wall of the rectangular, lower portion of the hopper. Both these shutters are fixed to a push rod 8, with their proximate ends overlapping and the rod is normally held by a spring 9 in the position shown in Fig. 1, the rod having at one end a nut 10, to limit its movement to the right, and having at the other end a button 11. A wire bracket 12 fixed in the hopper supports a rotary stirrer 13, having on its spindle 14 an arm 15, whose free end 16 is slidably engaged with a rotatable pivot 17 on the shutter 6.

The powder or granular substance is placed in the container 1, in which it is retained by the hopper 4, the latter being closed at the bottom by the shutter 7. For procuring delivery of a measured quantity thereof the rod 8 is pushed by hand, so that the upper shutter 6 is moved into its closed position, the lower shutter 7 being opened. In the course of this movement the powder or granular substance between the levels of the two shutters is discharged from the hopper and falls out of the container through the opening 3. The shutter 6 rotates the stirrer, to loosen the powder or granular substance.

We claim:

In a device for dispensing finely divided solid material, a hopper adapted to contain said material, said hopper having a funnel shaped partition extending across its lower portion, a bracket secured within the hopper, an agitating device supported by said bracket in the hopper and comprising arms extending into proximity to the partition walls, said partition being provided at its lower end with an opening, a horizontally disposed plate normally closing said opening, a second horizontal plate vertically spaced from said first mentioned plate, means for maintaining said plates vertically and horizontally spaced with edges overlapping, means to simultaneously move said plates horizontally to cause the first mentioned plate to open the opening and the other plate to close the opening and to discharge the material contained between the planes of said plates, means on the upper plate to slidably engage and actuate the agitating device upon horizontal movement, and means for automatically returning the first mentioned plate to position to close said opening and the other plate to open position.

In testimony that we claim the foregoing as our invention, we have signed our names.

ROBERT WEGMANN.
ALFRED RYMANN.